Jan. 16, 1923. 1,442,442
A. L. PUTNAM.
VEHICLE WHEEL.
FILED OCT. 3, 1919.
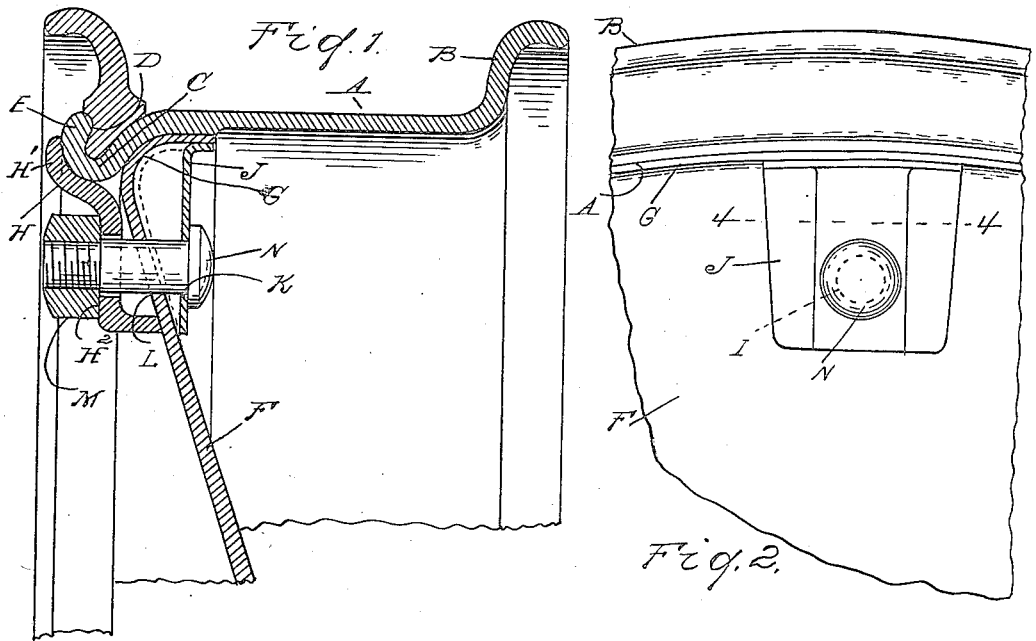
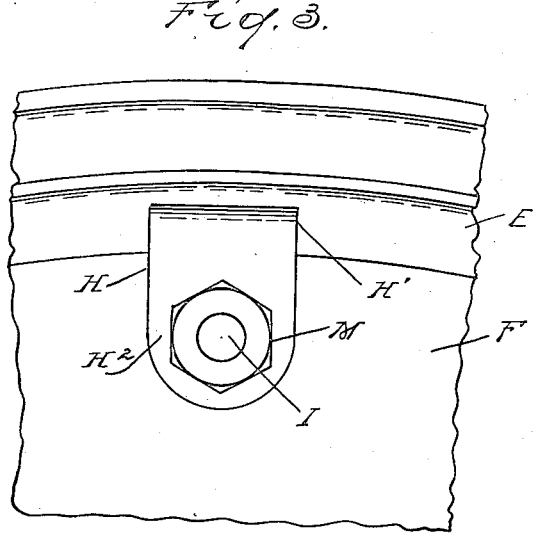
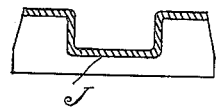
Inventor
Alden L. Putnam
By Whittemore Hulbert & Whittemore
Attorney Patented Jan. 16, 1923.

1,442,442

UNITED STATES PATENT OFFICE.

ALDEN L. PUTNAM, OF DETROIT, MICHIGAN, ASSIGNOR, BY MESNE ASSIGNMENTS, TO DETROIT PRESSED STEEL COMPANY, OF WILMINGTON, DELAWARE, A CORPORATION OF DELAWARE.

VEHICLE WHEEL.

Application filed October 3, 1919. Serial No. 328,283.

*To all whom it may concern:*

Be it known that I, ALDEN L. PUTNAM, a citizen of the United States of America, residing at Detroit, in the county of Wayne and State of Michigan, have invented certain new and useful Improvements in Vehicle Wheels, of which the following is a specification, reference being had therein to the accompanying drawings.

The invention relates to demountable rims of the type in which one of the tire flanges is removable and is normally secured by engagement with a groove in the rim. Rims of this type have heretofore been constructed from pressed or rolled metal with the groove formed by a return bent cross-section. Such rims are, however, either permanently mounted upon the wheel body or are secured thereto by a clamping engagement with the felly. I have devised a construction by which such a rim may be directly demountably clamped to a disk by utilizing the return-bent portion as a bearing for the periphery of the disk and by the provision of cooperating clamps for securing the same.

In the drawings:

Figure 1 is a cross-section through a disk wheel showing the demountable rim in engagement therewith;

Figure 2 is a side elevation thereof;

Figure 3 is an elevation from the opposite side of the disk;

Figure 4 is a cross-section on line 4—4 of Figure 3.

A is the rim having the fixed flange B at one side thereof and at its opposite side having the return-bent cross-section C for forming the groove D receiving the removable flange E. These parts are all of known construction and form no part of my invention, except as hereinafter set forth.

F is a disk wheel body which at its outer edge is formed with a portion G for fitting against the shoulder formed by the return-bent portion C of the rim. H designates clamping lugs secured to the disk by bolts I, said lugs having portions H' for embracing the return-bend C, as shown in Figure 1. With this construction, when the bolts are tightened, the lugs will be firmly clamped and will draw the portion G of the disk into engagement with the shoulder formed by the portion C of the rim.

To facilitate the engagement of the bolts, particularly where the disk is of a dished type, I have provided a series of bearings J. These are preferably formed of pressed sheet metal, fitting in the groove formed by the portion G of the disk and presenting a face which is substantially parallel with the plane of the wheel. This member J may be secured by spot-welding or other suitable means, and it is apertured at K to receive the bolt I, which also passes through a registering aperture L in the disk. The lug H is formed with a face H² which is parallel to the face of the member J, so that the nut M and head N of the bolt engage parallel surfaces.

While I have described my improvement as applicable to disk wheels, it is obvious that the essence of the invention is the securing of a rim to any construction of wheel by utilizing the return-bent portion of said rim for a bearing for the wheel body on one side and for the clamping means on the opposite side. This return-bent portion also forms a reinforcement for the rim, which stiffens the same and dispenses with the necessity of a felly.

What I claim as my invention is:

1. In a wheel, the combination with a rim having a return-bent portion for receiving a detachable tire securing flange, of a dished disk body for fitting against said return-bent portion, a series of lugs for engaging the outer face of said return-bent portion, clamping elements for securing said lugs to said disk and means carried by said disk providing bearing faces for said clamping elements in the plane of rotation of the wheel.

2. In a wheel, the combination with a rim having a return-bent portion forming a groove for receiving a detachable tire securing flange, of a dished disk having a peripheral portion for fitting against said return-bent portion of the rim, members secured to said disk forming bearing faces parallel to the plane of rotation of the wheel, clamping bolts engaging said members and projecting outward through apertures in said disk, and clamping lugs secured by said clamping bolts having portions for engaging the outer face of said return-bent portion of the rim.

3. In a wheel, the combination with a rim having a return-bent portion for receiving a detachable tire securing flange, of a disk body having a peripheral portion fitting against said return-bent portion of the rim, clamping means bearing upon said return-bent portion of the rim and engaging the disk body for demountably securing the rim to said body, and members secured to said disk body providing bearings engageable by said clamping means parallel to the plane of rotation of the wheel.

4. In a wheel, the combination with a rim having a return-bent portion for receiving a detachable tire securing flange, of a disk body having a peripheral cylindrical portion providing a seat for said rim and bearing against said return-bent portion of the rim, and clamping means demountably securing the rim upon said body engaging said disk and bearing exteriorly upon said return-bent portion of the rim.

5. In a vehicle wheel, the combination with a rim provided with an inwardly extending portion grooved for the reception of a detachable flange, of a disk secured to said rim fitting against said inwardly extending portion and reinforced thereby.

6. In a vehicle wheel, the combination with a rim having an inwardly extending return-bent portion forming a groove for the reception of a detachable flange, of a disk secured to said rim fitting against said inwardly extending portion and reinforced thereby.

In testimony whereof I affix my signature.

ALDEN L. PUTNAM.